Figure 3:
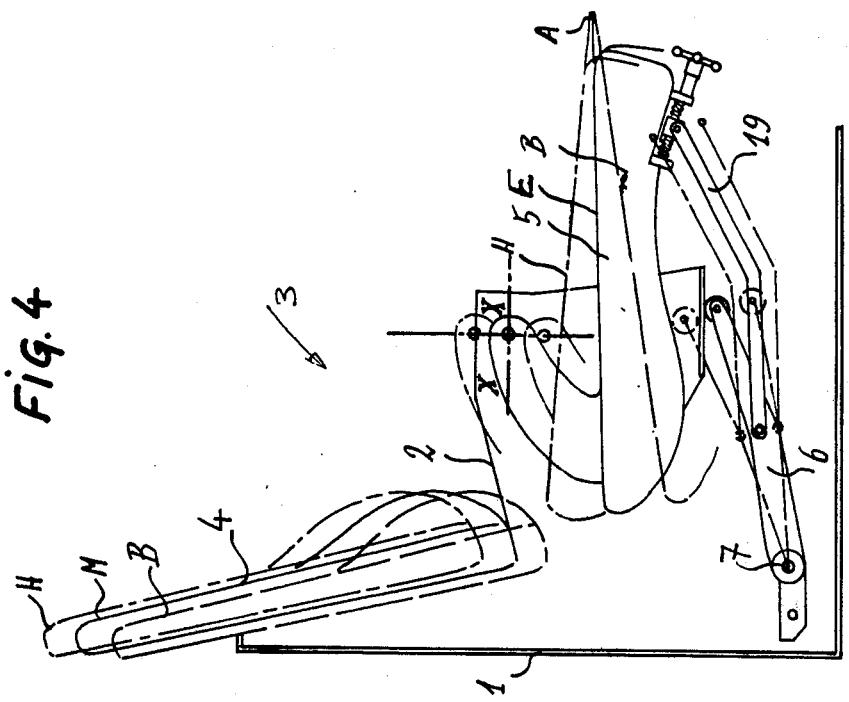

United States Patent [19]

Boulanger et al.

[11] 4,153,295

[45] May 8, 1979

[54] VEHICLE SEAT ASSEMBLY

[75] Inventors: Philippe Boulanger, Saulxures-les-Nancy; Lucien Roure, Laxou, both of France

[73] Assignee: Institut National de Recherche et de Securite pour la Prevention des Accidents du Travail et des Maladies Professionnelles, France

[21] Appl. No.: 800,865

[22] Filed: May 26, 1977

[51] Int. Cl.² .............................................. A47C 3/00
[52] U.S. Cl. .................................. 297/307; 248/591; 248/631
[58] Field of Search ...................... 297/307, 308, 309; 248/399, 400, 401

[56] References Cited

U.S. PATENT DOCUMENTS

| | | | |
|---|---|---|---|
| 1,929,024 | 10/1933 | Ingle | 297/307 |
| 2,629,427 | 2/1953 | McIntyre | 297/308 X |
| 3,338,543 | 8/1967 | Stuckenberger | 297/308 X |
| 3,356,413 | 12/1967 | Radke et al. | 248/399 |
| 3,567,279 | 3/1971 | Hall et al. | 297/309 |
| 3,752,432 | 8/1973 | Lowe | 248/400 |
| 3,774,963 | 11/1973 | Lowe | 297/307 |
| 3,788,697 | 1/1974 | Barton | 297/307 |
| 3,879,007 | 4/1975 | Barton et al. | 248/400 |
| 3,913,975 | 10/1975 | Carter | 297/307 |
| 3,954,298 | 5/1976 | Lowe | 297/308 |

Primary Examiner—Francis K. Zugel
Attorney, Agent, or Firm—Young & Thompson

[57] ABSTRACT

A seat assembly for an all-purpose vehicle such as a lorry or tractor comprises a frame carrying the seat. The frame is movably connected to a base secured to the vehicle.

9 Claims, 10 Drawing Figures

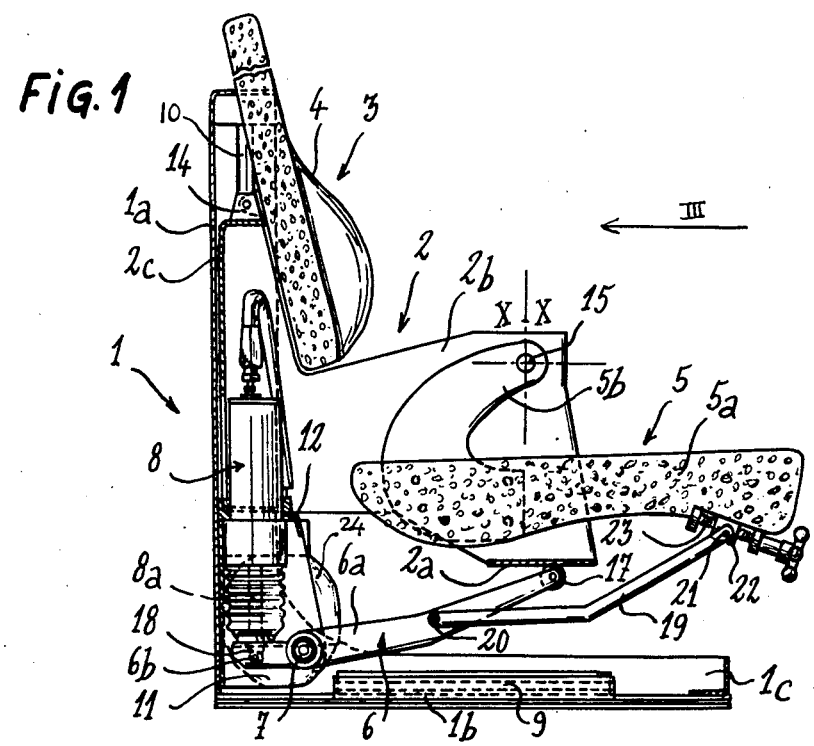
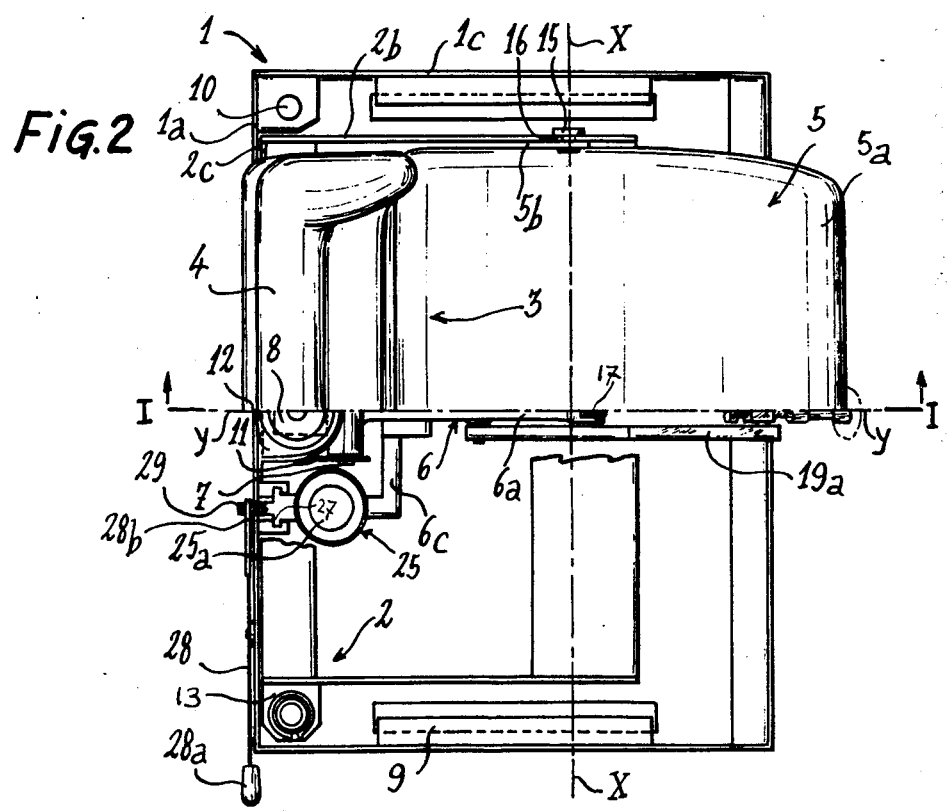

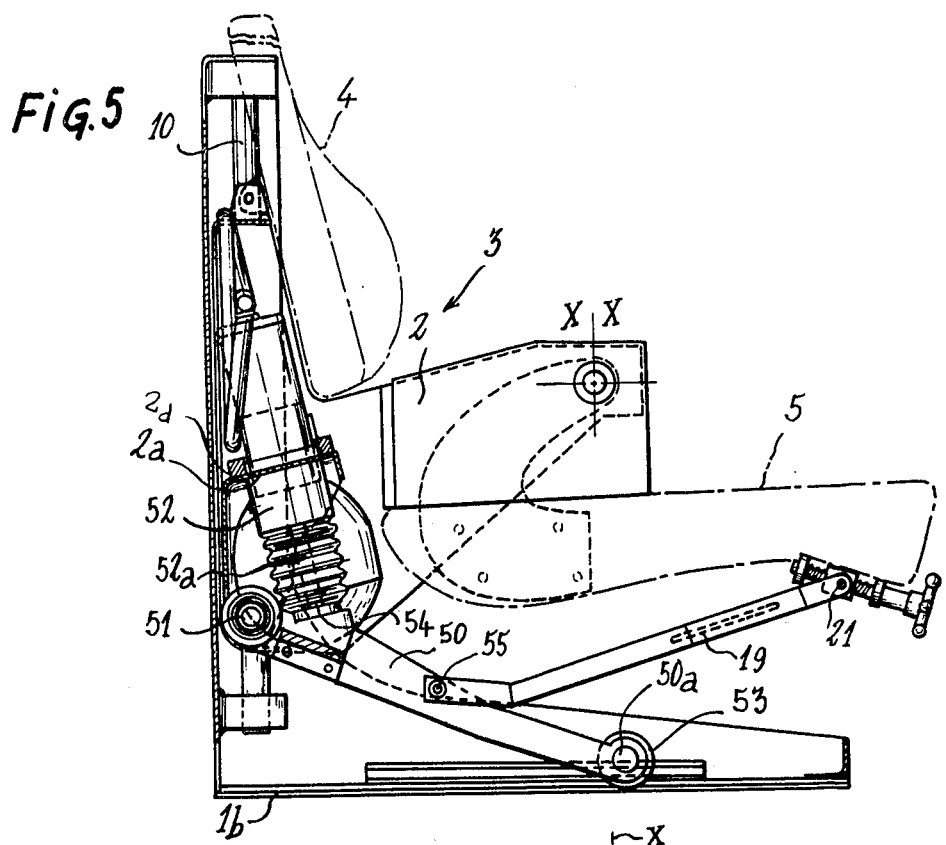
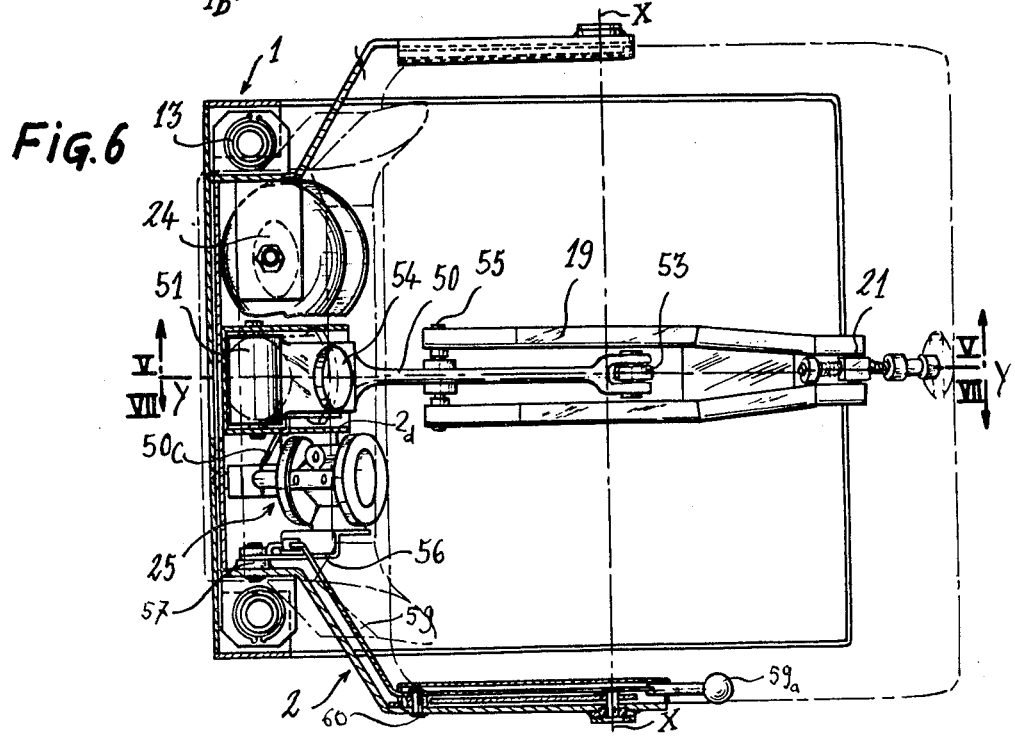

VEHICLE SEAT ASSEMBLY

This invention relates to a seat for vehicles, inter alia land vehicles adapted to move over rough ground.

More specifically, the invention relates to a seat for all-purpose vehicles such as lorries, appliances for public works, agricultural tractors and handling trolleys. This list, however, is not limitative and the seat according to the invention is also adapted for all vehicles, inter alia helicopters, operating under conditions similar to those of the aforementioned vehicles, with regard to vibrations and impacts during service.

As is known, all-purpose land vehicles, which are used inter alia in mines, quarries and building-sites, undergo repeated impacts and vibration during operation. The vibration of the driving elements, the impacts from certain working tools and high-amplitude oscillation produced by irregularity of the ground are transmitted to the driver, thus impairing his efficiency, affecting his health, and making driving dangerous.

It is found that in most cases, exposure of two or three hours a day is sufficient to affect the working capacity of the drivers, owing to the great fatigue resulting from vibration.

In the case of vehicles on tyres, the operating stages during which the appliance moves rapidly are the most painful and the most dangerous owing to the high-amplitude oscillation produced by irregularity in the ground.

In the case of slow-moving track vehicles, impacts and jolts result in violent jars which are transmitted through solid components to the driver's seat.

In addition, the seats can never be completely stabilised, since this would mean completely dissociating the vehicle chassis from the bearing surface on which the user rests. Clearly, if the seat tends to remain motionless whereas the bottom of the vehicle is oscillating with high amplitude, the driver's lower limbs may be moved a considerable amount, which may be a disadvantage since he may lose control of the pedals.

Consequently, the driver of such an appliance has to maintain a number of attitudes for a prolonged period, depending on the relative positions of the components of the aforementioned bearing surface and of the foot controls. These attitudes cannot be tolerated by the driver unless his posture meets certain conditions. More particularly, the joints must be prevented from taking up positions which will rapidly result in muscular and joint fatigue. As a result of research on long-term endurance, it is possible to give exact ranges of angles which are permissible for the various portions between joints. The ranges are as follows, in the case of the hip, knee and ankle angles:

Hip: 90° to 120°
Knee: 95° to 135°
Ankle: 160° to 180°

Numerous systems have been proposed for reducing the vibration and jolts transmitted to the vehicle user by the feet, while ensuring that the driver is in postures which can be tolerated.

It is known, for example, to use mechanical suspension systems comprising helical springs or torsion bars associated with a hydraulic shock-absorber. Suspension systems of this kind have the disadvantage of being practically useless in the case of low-frequency oscillation, e.g. below two cycles per second, since the flexibility of the system is limited by the static sag of the resilient return device under the weight of the driver.

It is also known to use penumatic and oleo-pneumatic suspension means comprising a pneumatic or hydraulic jack, a pneumatic accumulator and a distributor.

In a known embodiment, for example, the surface of the seat moves with respect to the base by rotating around a given point which substantially coincides with the position of the user's knees. Rotation is brought about by an assembly comprising three double-acting jacks associated with a pneumatic accumulator and a hydraulic distributor. This device has the major disadvantage of being very complex and bulky.

According to another known embodiment, the surface rotates at a substantially constant angular speed around a point in the neighbourhood of the user's knees, using a system of co-operating links connecting the seat surface and the base.

The last-mentioned system is incomplete and inadequate since it does not solve the problem of choosing the suspension means and the bulk thereof under the seat.

An object of the invention is to obviate the aforementioned disadvantages by providing a seat which moves so as substantially to suppress vertical vibration transmitted by the vehicle to the user, while ensuring that the user is in a normal position with respect to the manual and foot controls, even when the vehicle oscillates very considerably.

The invention relates to a seat for a vehicle, inter alia a land vehicle adapted to move over rough ground, comprising a base secured to the vehicle and a frame which can move with respect to the base and bears a surface supporting a passenger, the surface comprising a back and a seat surface, and resilient means connecting the frame to the base.

According to the invention, the seat is characterised in that the frame is movable in a straight line with respect to the base in a vertical direction when the vehicle is level, and in that the resilient means connecting the frame and the base comprise an oscillating arm pivoted to one of the aforementioned two elements around a horizontal axis and bearing in movable manner on the other element, the oscillating arm being acted upon by resilient return means which oppose movement of the frame with respect to the base, in at least one direction.

The aforementioned structure is used to stabilise the bearing surface, using simple mechanical means. Furthermore, the resilient connecting means can easily be disposed under the seat and their bulk does not influence the external dimensions of the seat.

Preferably, the resilient means for returning the oscillating arm comprise a hydraulic jack associated with an oleo-pneumatic accumulator and supplied by a source of pressure fluid via a hydraulic distributor comprising a control slide valve driven by the oscillating arm.

The oleo-pneumatic return means can be used to obtain a satisfactory dynamic characteristic for the means suspending the bearing surface. The return means also ensure that the surface remains in a central position irrespective of the driver's weight.

Alternatively, the back can be secured to the frame and the seat surface can comprise a rotating part pivoted to the frame along a horizontal axis, the rotating part being connected to the oscillating arm by a link.

When the vehicle is subjected to a vertical jolt, the back moves with respect to the seat surface but remains at a constant inclination, thus improving the passenger's comfort since his body and upper limbs remain in a constant direction. Simultaneously, the seat surface oscillates with respect to the back, so that the passenger's knees remain in a substantially fixed position with respect to the vehicle, so that his feet can easily retain contact with the foot controls.

Accordingly, the seat-surface assembly can be mounted on the frame so that it can rotate around a transverse axis extending substantially through the passenger's hip joints, so that he can easily put up with oscillation of the seat surface with respect to the back.

The seat surface may also have a rear part which is stationary with respect to the back, and a front rotating projection pivoted to a shaft secured to the stationary part of the seat surface, thus simplifying the mechanical components of the seat.

In a first embodiment, the oscillating arm is pivoted to the vertical part of the base along which the frame is slidably mounted, and the free end of the oscillating arm bears on a substantially horizontal part of the frame belonging to the bottom part of the seat surface.

In this manner, all the aforementioned features are put into effect.

In a second embodiment of the seat according to the invention, the oscillating arm is pivoted to the bottom part of the seat and extends obliquely, whereas its free end bears on a horizontal part of the base disposed under the seat surface. Consequently, the fragile hydraulic components are placed on the suspended part of the seat and thus undergo less severe stresses.

Other features and advantages of the invention will be clear from the following description.

The accompanying drawings, which are given by way of non-limitative example, show a number of embodiments of the invention.

Figure 4:
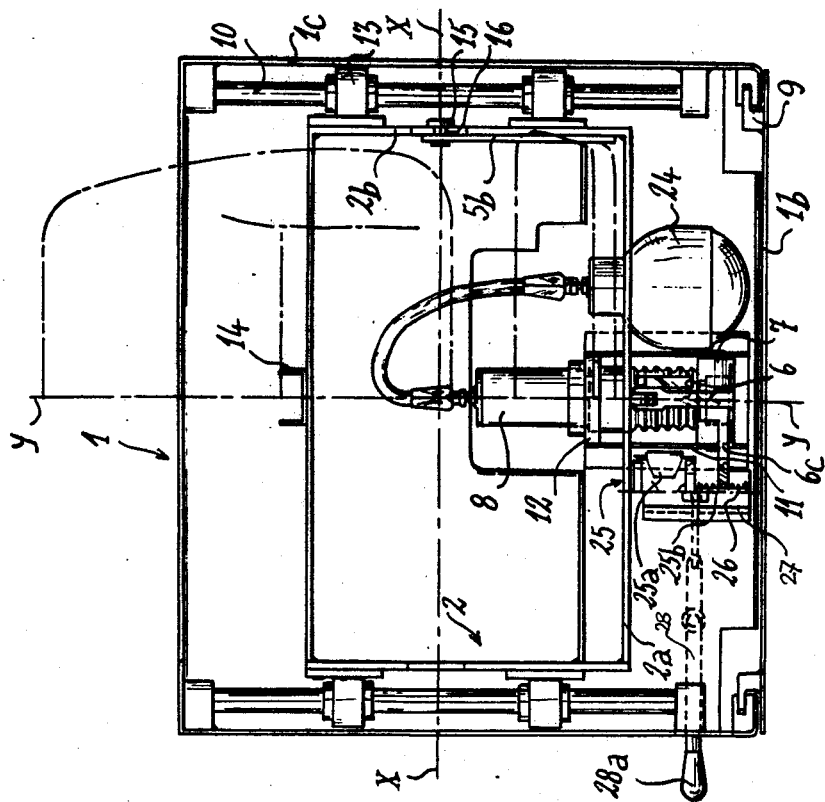
Figure 7:
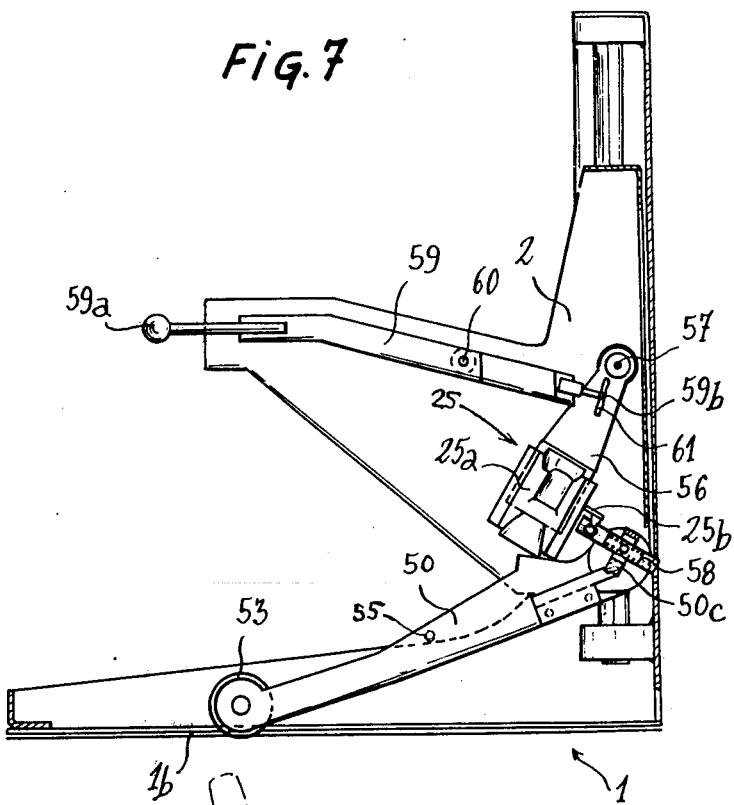
Figure 8:
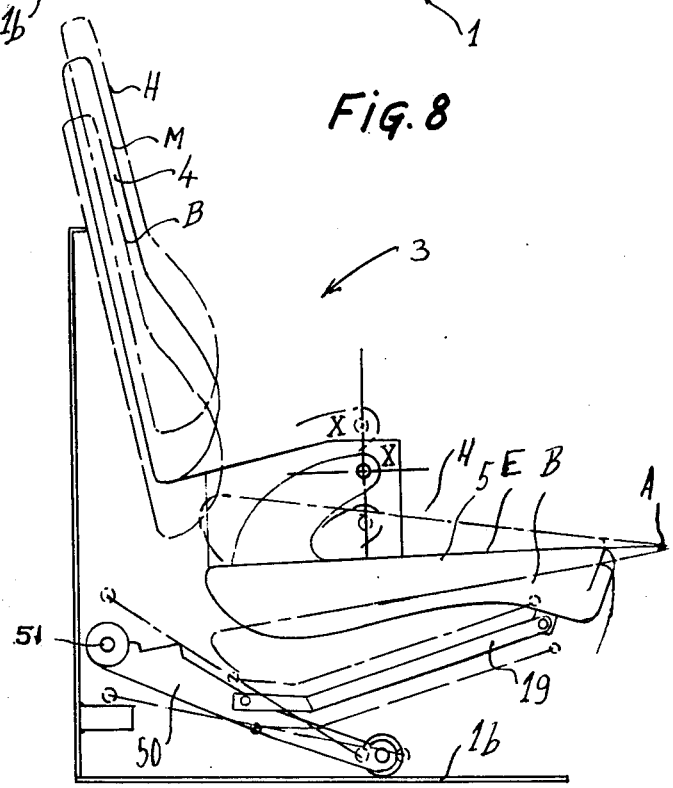
Figure 10:
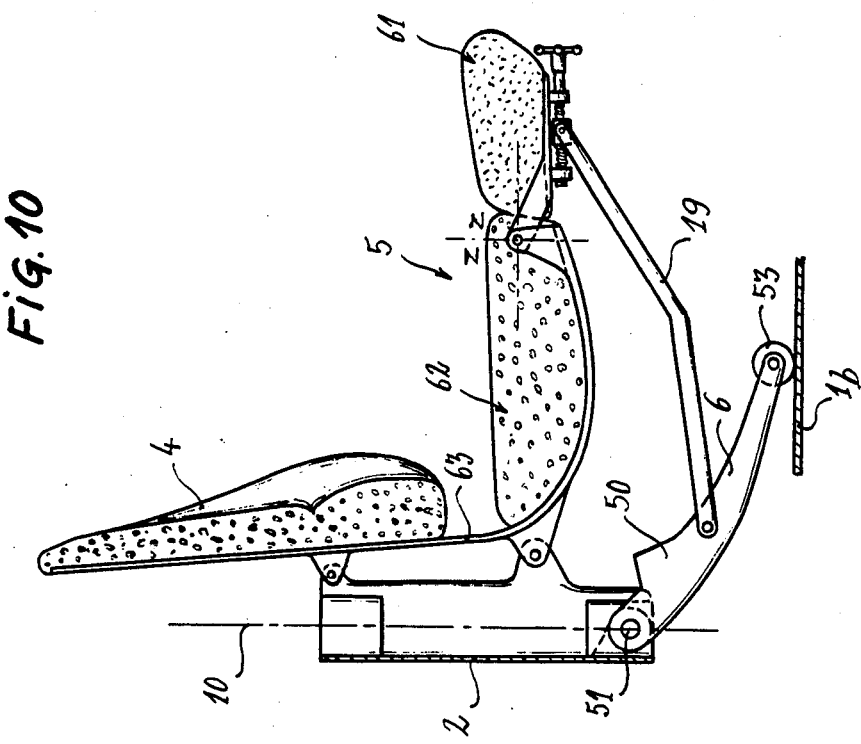

In the drawings:

FIG. 1 is an elevation in section along I—I (FIG. 2) of a first embodiment of the invention, FIG. 2 is a plan view, partly cut away, of the seat in FIG. 1, after half the bearing surface has been removed, FIG. 3 is a front view of the same seat III—III in FIG. 1, without the bearing surface and the link, FIG. 4 is a diagram illustrating the kinematics of the seat in the preceding Figures, FIG. 5 is an elevation, in section along V—V of FIG. 6, of a second embodiment of the invention, FIG. 6 is a plan view of the seat in FIG. 5, after the bearing surface has been removed, FIG. 7 is a view of the same seat in section along VII—VII of FIG. 6, after removing the bearing surface, jack and link, FIG. 8 is a diagram illustrating the kinematics of the seat in FIGS. 5 to 7, FIG. 9 is an elevation of the surface bearing the arm and link, in a variant of the seat in FIG. 1, and FIG. 10 is a view, under the same conditions, of the surface bearing the frame, arm and link in a variant of the seat in FIG. 5.

FIGS. 1-4 show a seat having a transverse vertical plane of symmetry Y—Y and comprising a rectangular base 1 secured to the vehicle and a frame 2 slidably mounted on base 1 and movable in a straight line, vertically when the vehicle is level. Base 1 has two transverse surfaces, i.e. a rear surface 1a and a bottom surface 1b connected by sides 1c. Surface 1b bears means 9 for securing to the vehicle. Frame 2 bears a surface 3 for supporting a passenger, comprising a back 4 inclined to the vertical and a seat surface 5, components 4 and 5 being stationary with respect to frame 2 and pivoted thereto around a transverse axis X—X extending substantially through the hip joints of the passenger sitting on the bearing surface 3.

Resilient connecting means between frame 2 and base 1 comprise an arm 6 oscillating around a substantially horizontal transverse axis 7 disposed below and behind the base and secured to the vertical surface 1a of base 1. The end of the one part 6a of arm 6 bears on a bottom sliding surface 2a of frame 2 under surface 5.

Arm 6 is acted upon by resilient return means comprising a jack 8 secured to base 1 and opposing downward motion of frame 2 with respect to base 1.

For simplicity we shall assume hereinafter that the vehicle is level and the horizontal and vertical directions will be defined accordingly. Similarly, the front and rear directions will be defined with respect to the passenger sitting on the bearing surface 3.

Two substantially vertical tubular shafts 10 are disposed, one on each side of the rear surface 1a near sides 1c. A central frame 11 secured to surface 1a at the bottom thereof bears shaft 7 and a bracket 12 for holding jack 8.

Frame 2 has two side plates 2b substantially parallel to the plane Y—Y and symmetrical with respect thereto, transversely connected by a substantially vertical back 2c and the aforementioned surface 2a. Sleeves 13 are disposed one on each side of back 2c and slidably engage shafts 10. Back 4 is secured to two shoulder brackets 14 secured to base 2c.

Surface 5 comprises a supporting cushion 5a bourne by two lateral wings 5b. Each wing 5b is disposed opposite the inner side of one of the plates 2b and is pivoted thereto at 15 around axis X—X. The height of wings 5b and the position of pivots 15 are such that axis X—X extends substantially through the hip joints of the aforementioned passenger.

Oscillating arm 6 extends obliquely upwards and is disposed substantially along the central plane Y—Y. It forms a lever having a front part 6a provided at its free end with a roller 17 which bears on surface 2a of frame 2, whereas the rear, shorter part 6a of the lever has a portion 18 for engaging the end of a thrust rod 8a of jack 8.

A link 19, disposed substantially along the central plane Y—Y, mechanically connects a portion of arm 6 to the front of member 5. The two ends of link 19 are pivoted around two shafts substantially parallel to the X—X axis, i.e. shaft 20 borne by the arm and shaft 21 borne by a nut 22 engaging a manually controlled endless screw 23 secured to member 5. In the embodiment in FIGS. 1-3, link 19 comprises two substantially parallel rods 19a straddling arm 6, whereas shaft 20 is substantially half way between shaft 7 and roller 17.

Jack 8 is associated with an oleo-pneumatic accumulator 24 supplied by an external source of pressure fluid (not shown) via a hydraulic distributor 25.

Distributor 25, which is of a known kind, comprises a casing 25a in which a control slide valve 25b slides.

Depending on the relative position of valve 25b and casing 25a, the assembly formed by jack 8 and accumulator 24 is either connected to the aforementioned source of fluid, or hydraulically isolated, or connected to the tank.

Casing 25b is secured to base 1, and valve 25b is driven by arm 6 via lateral finger 6c and a resilient strap 26. The various aforementioned components are positioned so that jack 8 is connected to the tank when arm 6 is in the top position, isolated when the arm is in an intermediate position and connected to the source of fluid when the arm is in the low position.

Casing 25a is connected to base 1 by a dovetail adjusting connection 27 allowing sliding parallel to the movement of valve 25b. A lever 28 for manually adjusting the position of casing 25a is pivoted around base 1 and has a control handle 25a at one end, whereas its other end 28b engages an extension 29 of casing 25a. In the embodiment in FIGS. 1-4, valve 25b and the dovetail connection 27 slide vertically.

The thus constructed seat operates as follows:

When the vehicle and source of pressure fluid are at rest, the frame is at rest in a low position B (FIG. 4). Consequently, communication between jack 8 and the pressure source (which is inoperative at the moment under consideration) is completely open via distributor 25.

Next, the pressure source is switched on and immediately supplies jack 8. The pressure slowly rises in accumulator 24 and the rod of member 8a progressively bears on part 6b and raises part 6a and frame 2. After a number of transient movements corresponding to the dynamics of the hydraulic system and the shock-absorption thereof, frame 2 comes to rest at an equilibrium height E (FIG. 4) at which the inclination of arm 6 is such that valve 25b, with respect to casing 25a, occupies a position in which jack 8 is hydraulically isolated. The pressure in jack 8 is then such that its thrust exactly balances the weight of frame 2.

If a passenger sits on surface 3, the system becomes unbalanced by his weight and frame 2 descends. As a result of the co-operation of arm 6 and valve 25b, jack 8 is then re-supplied with pressure fluid until it balances the additional weight, whereupon frame 2 finally returns to the height E.

Consequently, the central position of the seat is independent of the passenger's weight.

The central position can be adjusted simply by moving casing 25b with respect to the base 1 in the sliding direction of valve 25b, by acting on the handle 28a of lever 28. Thereupon the hydraulic assembly operates so that slide 25b follows casing 25a and frame 2 comes to rest at a new equilibrium at which jack 8 and accumulator 24 are hydraulically isolated.

The passenger may also adjust the inclination of surface 5 by acting on screw 23.

Consequently, before the vehicle starts, the central position of the seat and the corresponding inclination of surface 5 can be very easily adjusted by the passenger as required.

When the vehicle is moving, frame 2 moves with respect to base 1 so as to absorb shocks and vibrations therein and protect the passenger.

The bearing surface then oscillates between two extreme positions H and B (FIG. 4). Back 8 remains in a constant direction with respect to slide means 10, whereas surface 5 oscillates around axis X—X which is stationary with respect to back 4. The oscillation reduces the amplitude of motion of the front part of seat 5 with respect to back 4. Consequently, the passenger's knees remain near a point A which is stationary with respect to the vehicle, and therefore move very little with respect to the foot controls, so that the passenger remains perfectly in control of them.

The oleo-pneumatic system is substantially passive with regard to vibration occurring on an even ground, usually at frequencies above 1.5 Hz. The rapid motion of valve 25b has practically no effect on jack 8, owing to the capacity of accumulator 24. Consequently, the action of distributor 25 is limited to maintaining the central position of frame 2, with a high time constant. It is thus very easy to adjust the natural frequency and shock-absorption of the aforementioned passive system so that the dynamic performance of the suspension means ensures the passenger's comfort by giving maximum isolation from the jolts of the vehicle.

Experience shows that the driver of an appliance fitted with the seat undergoes only a quarter or a fifth of the vertical vibrations experienced with a conventional seat, while easily retaining control of the pedals and without experiencing any substantial interference in driving. Furthermore, since the axis X—X round which the seat oscillates coincides with the driver's hip joints, the deformation of surface 3 is very easy to endure.

In addition, the seat can be adapted to medium-pressure circuits of vehicles provided with a hydraulic unit. The medium pressure (several tens of bars) ensures that the components are very compact, particularly when the pressure exceeds 50 bars, which is the case in numerous existing vehicles. Finally, owing to the permanent flow of hydraulic fluid in the suspension elements, shocks can be absorbed without an excessive increase in temperature.

All the hydraulic elements and all the movable components are substantially below the bearing surface 3, so that the bulk of the assembly is of the same order as that of a conventional seat.

FIGS. 5-8 show a seat comprising an oscillating arm 50 extending obliquely and pivoted around a substantially horizontal transverse shaft 51 at the bottom of frame 2.

The free end 50a of arm 50 bears on the substantially horizontal bottom surface 1b of the base, surface 1b being disposed under the seat surface 5.

Arm 50 forms a lever acted upon by a jack 52 secured to a frame 2d attached to frame 2. Arm 50 extends substantially along the plane of symmetry Y—Y and its free end 50a is provided with a roller 53 moving on surface 1b. Near shaft 51 arm 50 has a portion 54 co-operating with the end of a thrust rod 52a of jack 52. An intermediate shaft 55 parallel to shaft 51 serves as a pivot for that end of link 19 remote from pivot 21.

Jack 52 is associated with accumulator 24 and distributor 25, which are both disposed on frame 2. Casing 25a of distributor 25 is mounted on a support 56 (FIG. 7) pivoted at 57 on frame 2 around an axis parallel to shaft 51, so that the direction in which control valve 25b slides, with respect to casing 25a, is perpendicular to shaft 51. The free end of a lateral finger 50c secured to arm 50 is connected to valve 25b by a resilient strap 58 (FIG. 7).

A lever 59 for manually adjusting the position of casing 25a is pivoted to plate 2b at 60. It is parallel to plate 2b and slightly inclined to the horizontal. It has a control handle 29a at one end and a finger 59b at the other end, engaged in a cam or groove 61 in support 66.

During operation, the thrust of rod 52a on portion 54 holds arm 50 in an oblique position and resiliently balances the weight of frame 2 and of the passenger.

In order to adjust the equilibrium height E of frame 2, as shown in continuous lines in FIG. 8, the passenger acts on control handle 59a. He thus, by means of finger 59b, groove 61 and support 59, changes the position of casing 25a with respect to frame 2 and shaft 51. In a manner similar to that described in connection with FIGS. 1–4, the equilibrium position of arm 50 and frame 2 is thus modified to suit the passenger.

FIG. 8 shows the extreme positions of surface 3 in FIGS. 5–8 with respect to base 1 when the vehicle is subjected to jolting and vibration when travelling over rough ground. Back 4 remains in a constant position with respect to shaft 10 on which frame 2 slides, whereas surface 5 oscillates around axis X—X so that the passenger's knees remain near the fixed point A.

The seat in FIGS. 5–8 has the same advantages, with regard to comfort and bulk, as the embodiment in FIGS. 1–4. In addition, the heavy, sensitive components of the oleo-pneumatic system are protected by the frame suspension means and thus operate under improved conditions.

The invention is not limited to the embodiments described hereinbefore and can have numerous variants.

Figure 9:
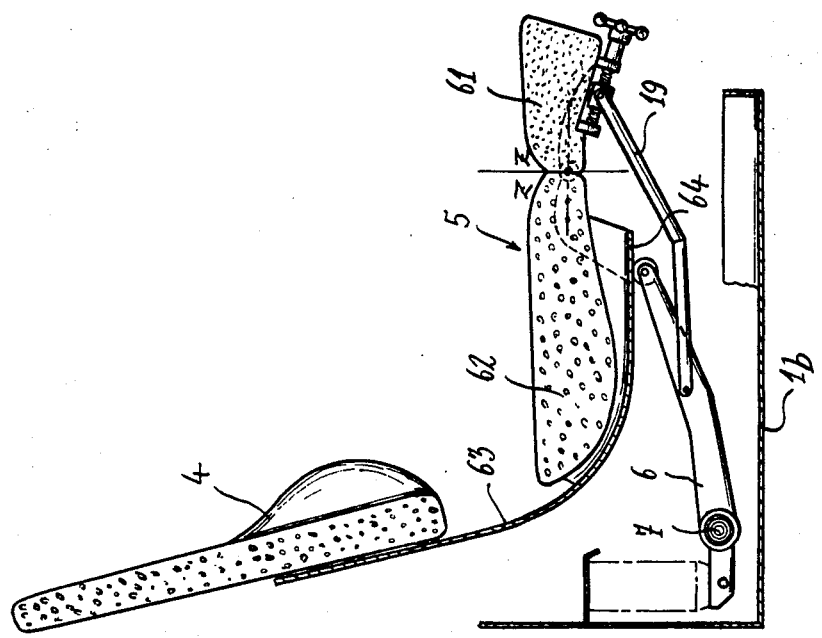

More particularly, as shown in FIGS. 9 and 10, the oscillating part of surface 5 can be limited to a rotary projection 61 pivoted around a horizontal transverse axis Z—Z. In that case, surface 5 has a part 62 secured to back 4 by a support 63 mounted on frame 2 (not shown). This feature can greatly simplify the structure of frame 2 and surface 5, and experience has shown that it provides adequate passenger comfort.

FIG. 9 is a diagram of a variant of the seat in FIGS. 1–4 provided with a surface of the aforementioned kind, wherein roller 17 rolls on a bottom surface 64 of support 63.

FIG. 10 is a diagram of a variant of the seat in FIGS. 5–8, provided with a similar surface in two parts 61. 62.

We claim:

1. A seat assembly for a vehicle, particularly a land vehicle adapted to move over rough ground, said assembly comprising a base adapted to be mounted on said vehicle substantially horizontal when the vehicle is level, and a frame slidingly mounted on the base for up and down movement relative to the base, the sliding frame supporting a back for a passenger, and a seat mounted on the frame for pivotal movement relative to the back about a horizontal axis, said seat having its front part opposite to the back supported by a slanted connecting rod arranged under the seat, an oscillating suspension arm having one end pivotally mounted on the frame below the back, the other end of the suspension arm comprising a bearing roller resting on a surface of the base, resilient means comprising a hydraulic jack and a pressure accumulator acting between the frame and the oscillating arm to apply a suspension force to the latter, to ensure a flexible suspension of the sliding frame with respect to the base, said slanted connecting rod supporting the front part of the seat being hinged on the oscillating arm between the pivotal joint of the latter on the frame, and its bearing roller resting on said surface of the base, said suspension force of the hydraulic jack being applied to the oscillating arm in the vicinity of but offset from the pivotal joint of the latter on the sliding frame.

2. A seat assembly according to claim 1, wherein the slanted connecting rod supporting the front part of the seat is mounted on the latter through a joint having an adjustment screw for changing at will the mean slope of the seat with respect to the back, in a rest position of the sliding frame.

3. A seat assembly according to claim 1, wherein the pivotal joint of the seat is arranged substantially vertically over the bearing roller of the suspension arm resting on said surface of the base.

4. A seat assembly according to claim 1, wherein the slanted rod connecting the front part of the seat with the suspension arm is hinged substantially at the middle of said arm.

5. A seat assembly according to claim 1, in which the hydraulic jack and accumulator are combined with a hydraulic circuit connected with a pressure accumulator and an outside pressure source, to control said jack through a hydraulic distributor having a sliding control member, wherein said accumulator and said distributor are mounted on the sliding frame.

6. A seat assembly according to claim 5, wherein the hydraulic jack, the accumulator and the distributor are mounted on the sliding frame behind the back and the rear part of the seat.

7. A seat assembly according to claim 5, wherein said sliding control member of the hydraulic distributor is resiliently connected to the oscillating suspension arm, at a point of the latter spaced from its pivotal joint on said frame.

8. A seat assembly according to claim 5, wherein said hydraulic distributor is pivotally mounted on the sliding frame and resiliently connected with a control lever mounted on the frame, to allow the passenger to adjust at will the mean height of the sliding frame with respect to the base, by an appropriate displacement of said distributor with respect to its control member connected with the oscillating suspension arm.

9. A seat assembly according to claim 5, wherein said control lever resiliently connected with the hydraulic distributor is installed on an arm rest of the seat.

* * * * *